United States Patent [19]

Charbonnet

[11] Patent Number: 4,547,115
[45] Date of Patent: Oct. 15, 1985

[54] APPARATUS FOR TRANSPORTING AND ALIGNING PANEL-LIKE MEMBERS

[76] Inventor: Carl D. Charbonnet, 4323 Kennesaw Dr., Birmingham, Ala. 35213

[21] Appl. No.: 573,849

[22] Filed: Jan. 25, 1984

[51] Int. Cl.⁴ .......................................... B65G 59/04
[52] U.S. Cl. .................................... 414/121; 198/434; 271/236; 271/241; 271/250; 271/252; 414/36; 414/113; 414/589; 414/590; 414/744 B; 414/783
[58] Field of Search ............... 414/121, 752, 589, 590, 414/35, 36, 71, 113, 28, 29, 112, 122, 70, 744 B, 744 C, 754, 783; 271/11, 250, 252, 236, 226, 241; 198/422, 434

[56] References Cited

U.S. PATENT DOCUMENTS

| 3,193,136 | 7/1965 | Stumf et al. | 414/783 X |
| 3,765,542 | 10/1973 | White | 414/745 X |
| 4,392,766 | 7/1983 | Blunt | 414/121 X |
| 4,452,351 | 6/1984 | Meeker | 271/236 X |

FOREIGN PATENT DOCUMENTS

| 2454987 | 11/1980 | France | 414/71 |
| 145011 | 11/1980 | German Democratic Rep. | 414/113 |
| 36973 | 11/1970 | Japan | 414/152 |
| 0056431 | 5/1981 | Japan | 414/121 |

Primary Examiner—Frank E. Werner
Attorney, Agent, or Firm—Woodford R. Thompson, Jr.

[57] ABSTRACT

Panel-like members are aligned as they are transferred sequentially from a pick-up station to a discharge station by a primary carriage mounted for linear movement selectively to the pick-up position and to a position adjacent the discharge station. At least one extensible, secondary carriage is carried by the primary carriage and is rotatable about a vertical axis selectively to a transport position and to an aligned position and is movable linearly to an extended position and to a retracted position. The secondary carriage and a pick-up head carried thereby is movable selectively to an upper transport position and to a lower pick-up and discharge position. Linear movement of the primary carriage is stopped prior to its reaching the discharge station with the secondary carriage being movable toward an extended position after movement of the primary carriage is stopped. Alignment stop at the discharge station engages at least one edge of the panel-like member being transferred upon movement of the secondary carriage toward extended position to impart rotation to such panel-like member about a vertical axis to thus align any misaligned panel-like members prior to discharge thereof. The secondary carriage is returned to its retracted position and to its transport position after discharge of a panel-like member and before returning to the pick-up station.

14 Claims, 12 Drawing Figures

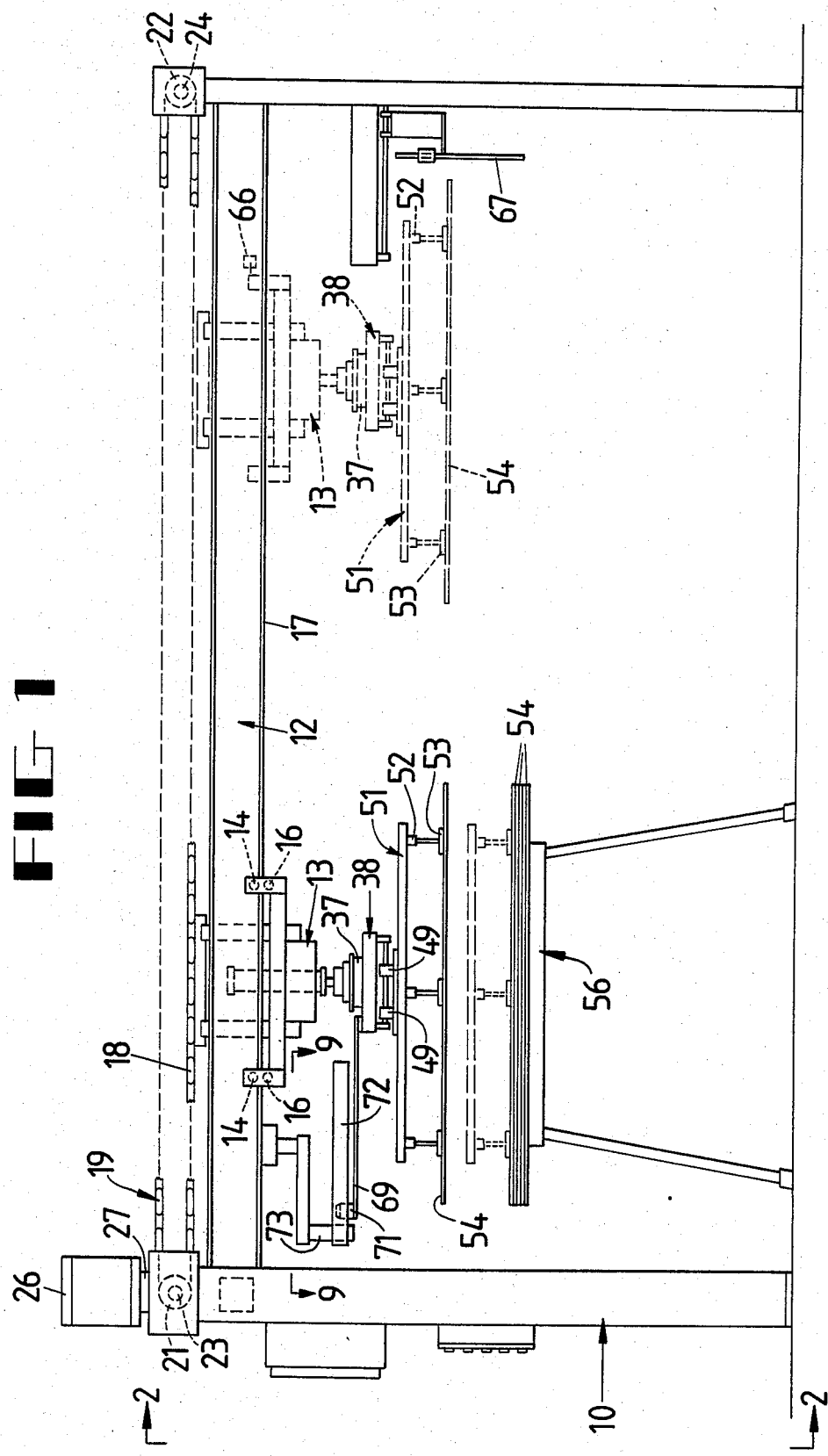

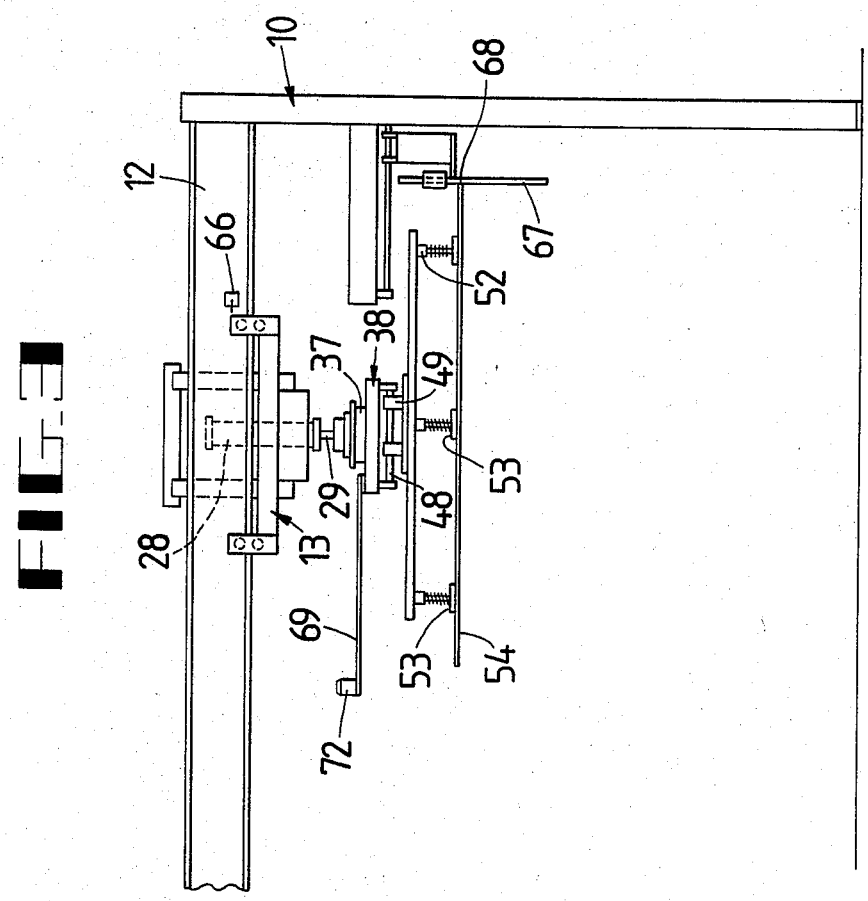
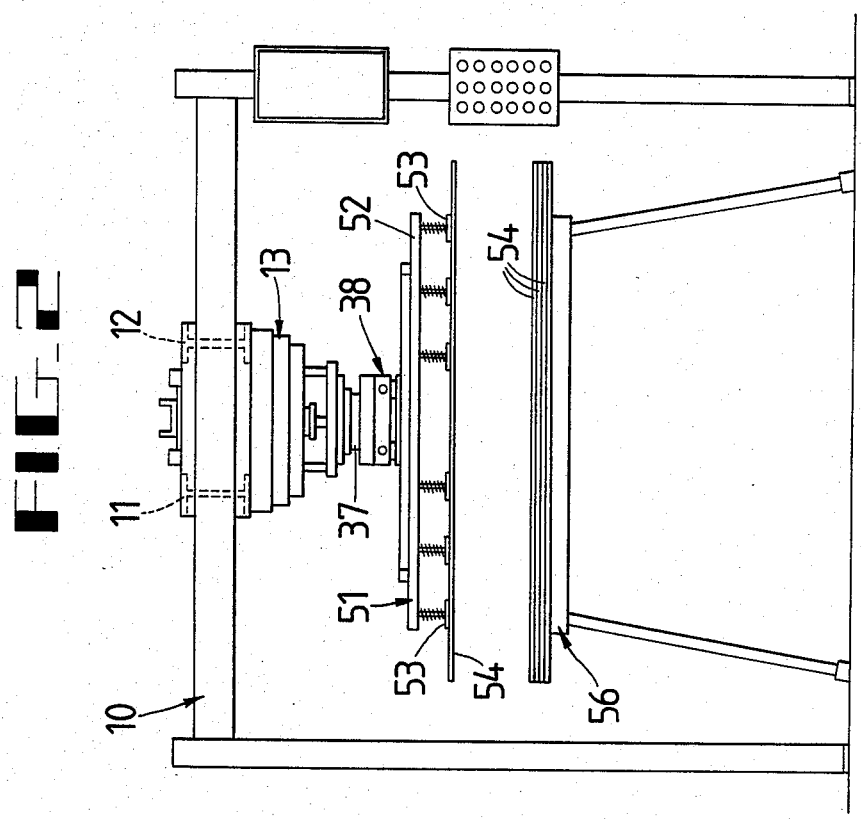

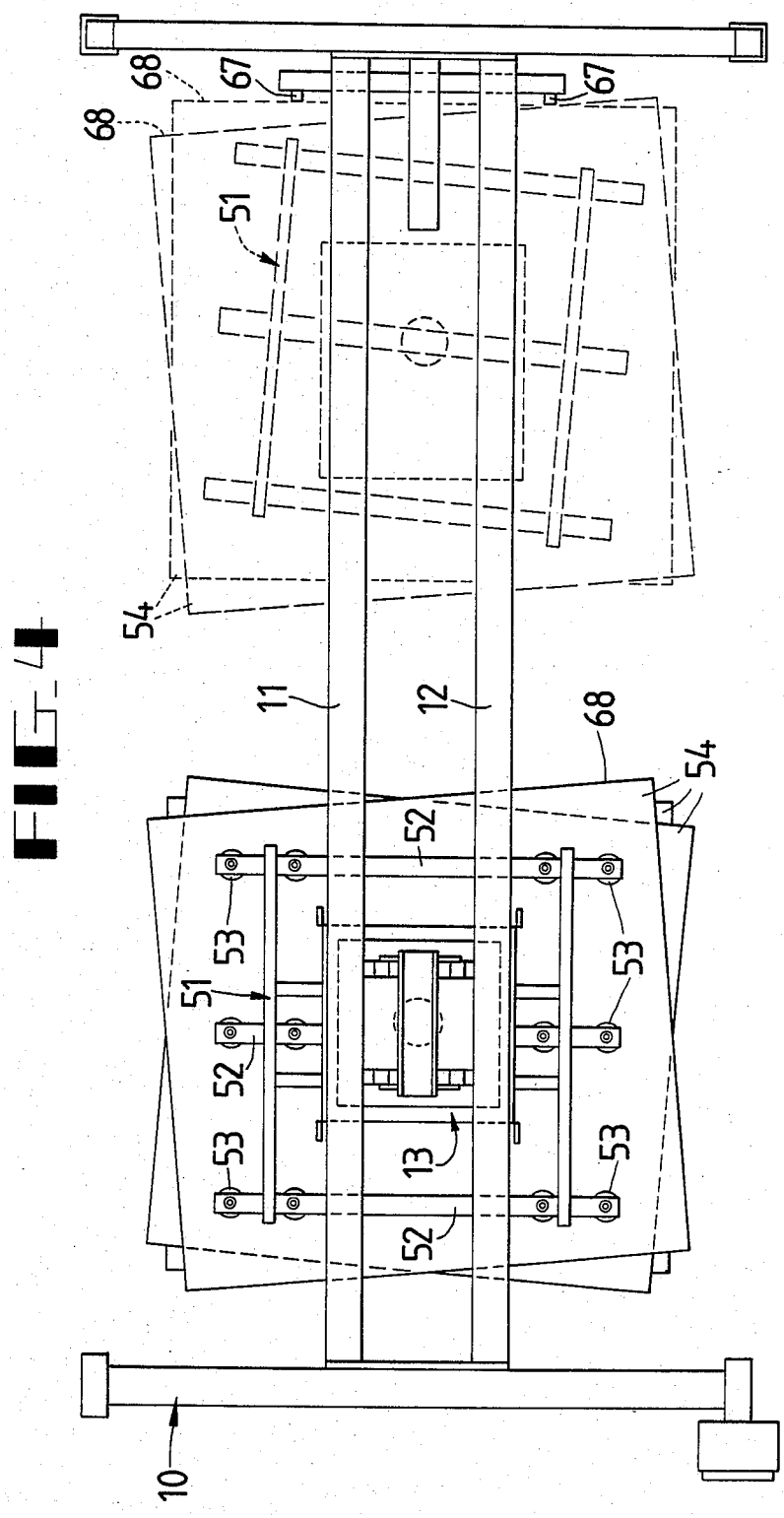

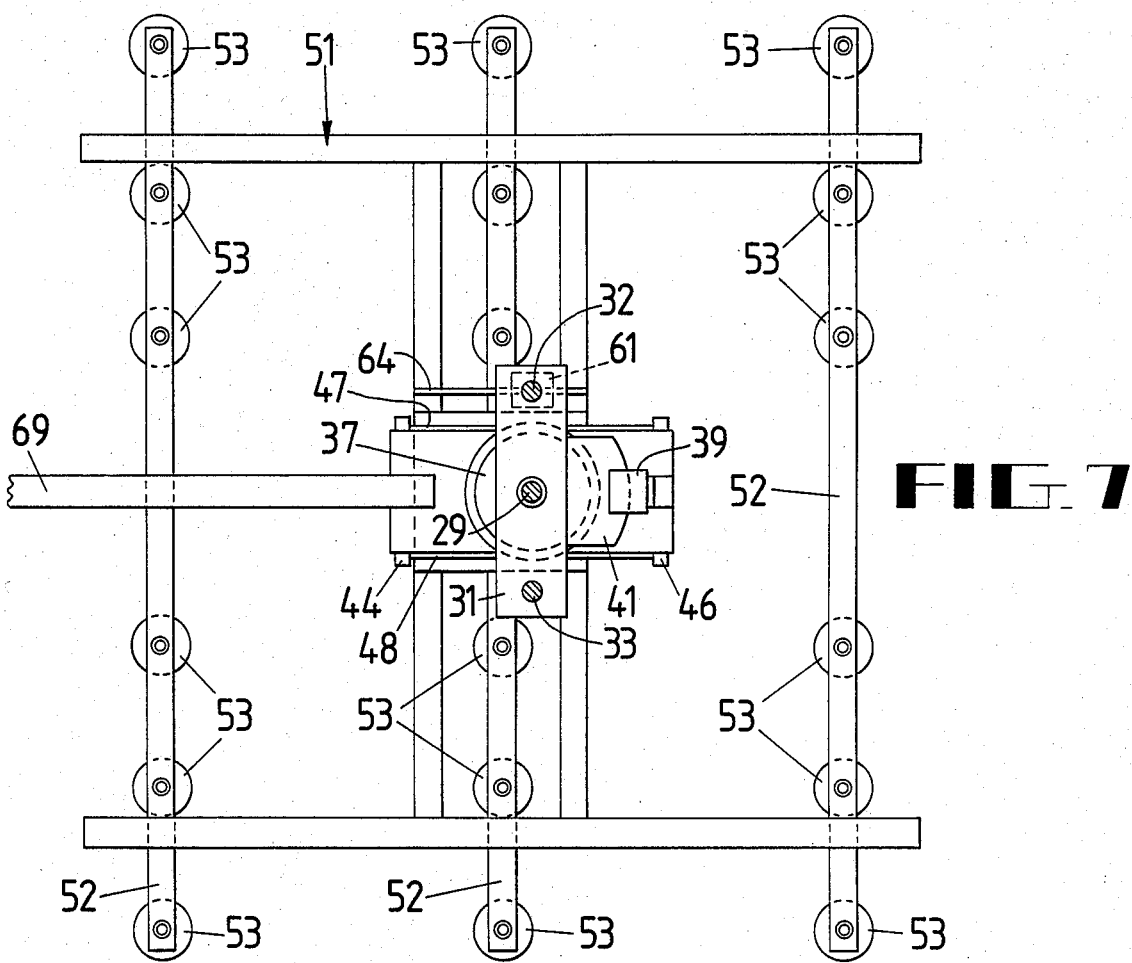
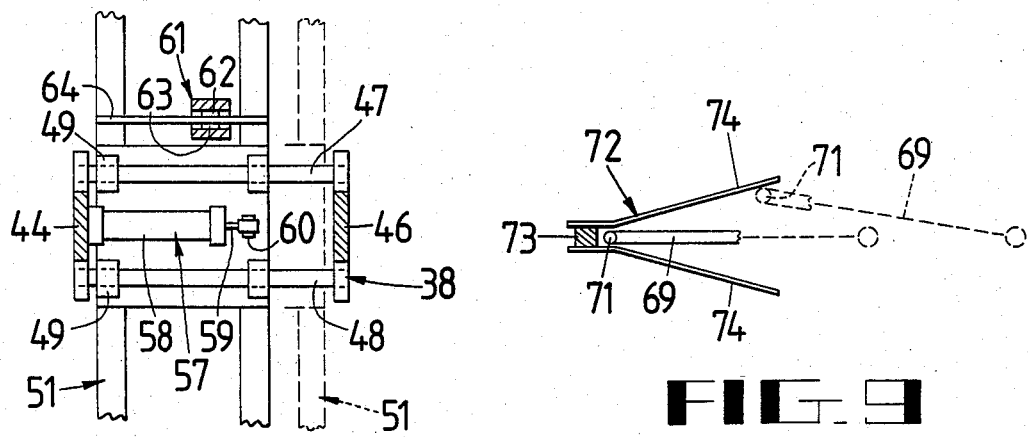

APPARATUS FOR TRANSPORTING AND ALIGNING PANEL-LIKE MEMBERS

BACKGROUND OF THE INVENTION

This invention relates to apparatus for transporting and aligning panel-like members and more particularly to apparatus for sequentially transferring and aligning panel-like members as they are moved from a pick-up station to a discharge station.

Heretofore in the art to which my invention relates, difficulties have been encountered in aligning misaligned panel-like members, such as sheets, plates, boards and the like, as they are transferred sequentially from a stack of such panel-like members to a discharge station. Heretofore, it has been the usual practice to align all such panel-like members in a stack prior to removal of any of the panel-like members from the stack. Not only is it a time consuming task to prealign all of the panel-like members in a stack but it is also very difficult to maintain the individual panel-like members in true alignment with each other and in true alignment with the direction of travel as the panel-like members are removed sequentially from the stack.

BRIEF SUMMARY OF THE INVENTION

To overcome the above and other difficulties, I provide apparatus wherein the individual panel-like members are moved from a transport position to an aligned position after the panel-like members leave the pick-up station and prior to being discharged. Accordingly, it is not necessary to realign the panel-like members in the stack and then maintain such prealigned panel-like members in true alignment with each other as the panel-like members are sequentially removed from the stack.

An object of my invention is to provide apparatus for sequentially transferring and aligning panel-like members wherein the panel-like member being transferred is moved in a linear direction until it reaches a location adjacent its point of discharge and then continued linear movement of the panel-like member causes any misaligned panel-like members to rotate about a vertical axis from its transport position to an aligned angular position with its edges properly positioned linearly prior to being discharged.

Another object of my invention is to provide apparatus for transporting and aligning panel-like members of the character designated in which the panel-like members are transferred sequentially by a primary carriage mounted for linear movement selectively to a pick-up station and to a position adjacent a discharge station with there being at least one extendible secondary carriage carried by the primary carriage and adapted for rotation about a vertical axis selectively to a transport position and to an angularly aligned position and also being movable linearly relative to the primary carriage selectively to an extended position and to a retracted position to correctly position at least one edge of each panel-like member.

A still further object of my invention is to provide apparatus for sequentially transferring and aligning panel-like members of the character designated in which two extensible secondary carriages are carried by the primary carriage with one secondary carriage being movable in a linear direction at an angle relative to the direction of movement of the other secondary carriage whereby the leading edge and an edge adjacent such leading edge of a misaligned panel-like member engage stop means which in turn imparts rotary movement to each of the secondary carriages to its angularly aligned position and correctly positions such leading edge and the edge adjacent thereto.

DESCRIPTION OF THE DRAWINGS

Apparatus embodying features of my invention is illustrated in the accompanying drawings, forming a part of this application, in which:

FIG. 1 is a side elevational view, partly broken away and in section and with parts being omitted for the sake of clarity;

FIG. 2 is an end view taken generally along the line 2—2 of FIG. 1;

FIG. 3 is a fragmental view showing the pick-up head and its supporting carriages moved to the discharge position, with parts being omitted for the sake of clarity;

FIG. 4 is a top plan view showing the primary carriage and its supporting guide means and showing the positions of the pick-up head and the panel-like member carried thereby relative to the primary carriage as the primary carriage moves from the pick-up station to the discharge station, with parts being omitted for the sake of clarity;

FIG. 7 is a view taken generally along the line 7—7 of FIG. 6;

FIG. 8 is a sectional view taken generally along the line 8—8 of FIG. 5;

FIG. 9 is a sectional view taken generally along the line 9—9 of FIG. 1;

DETAILED DESCRIPTION

Figure 6:
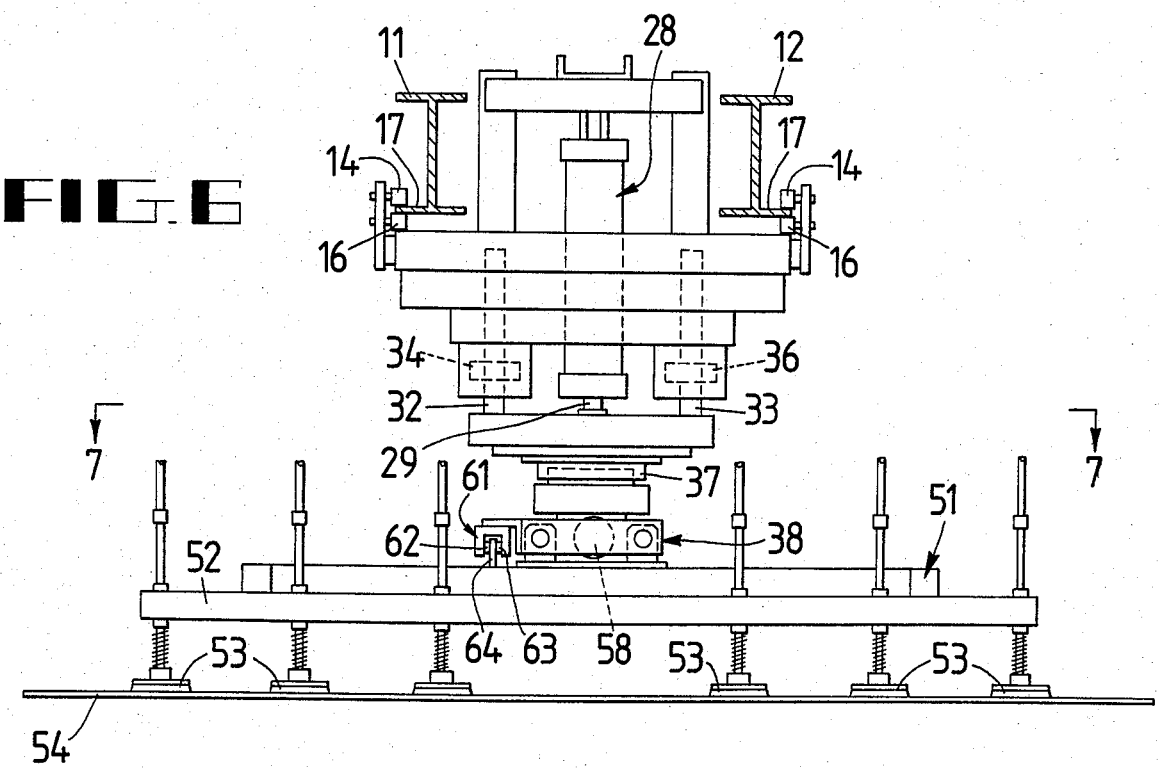
FIG. 6 is a view taken generally along the line 6—6 of FIG. 5.

Referring now to the drawings for a better understanding of my invention, I show a supporting frame 10 having an elongated guide member in the form of parallel guide rails 11 and 12. Mounted for longitudinal movement along the guide rails 11 and 12, as shown in FIG. 6, is a primary carriage 13 having pairs of oppositely disposed rollers 14 and 16 which engage opposite sides of an outturned flange 17 carried by each of the guide rails 11 and 12. As shown in FIG. 1, the primary carriage 13 is operatively connected to the lower flight 18 of an endless drive chain 19 which passes around sprockets 21 and 22 mounted on transverse shafts 23 and 24, respectively, at opposite ends of the supporting frame 10. The transverse shaft 23 is operatively connected to a drive motor 26 through a suitable drive unit 27.

Figure 5:
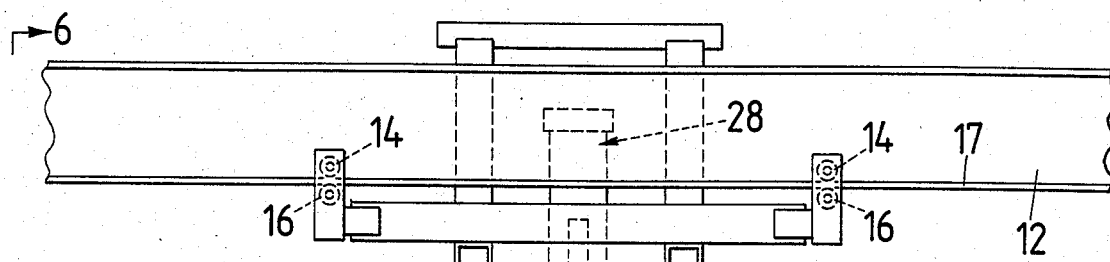
FIG. 5 is an enlarged, fragmental view showing the primary carriage and the means for supporting the secondary carriage for rotation relative thereto and the brake means for holding the secondary carriage in selected positions.

As shown in FIGS. 5 and 6, a vertically extending fluid pressure operated piston and cylinder unit 28 is carried by the primary carriage 13. The fluid pressure operated unit 28 has a depending piston rod 29 with the lower end thereof connected to a unit 31 which is adapted for vertical movement relative to the primary carriage 13. Upstanding guide members 32 and 33 are carried by the unit 31 and extend upwardly through suitable bearing members 34 and 36, respectively, whereby the unit 31 moves vertically without rotation as the piston rod 29 is extended and retracted.

Rotatably connected to the lower portion of the vertically movable unit 31 by a suitable bearing assembly 37 is an extensible secondary carriage 38 which is adapted for rotation about a vertical axis selectively to a transport position and to an aligned position to be described more specifically hereinafter. As shown in FIGS. 5 and 7, a brake unit 39 is interposed between the secondary carriage 38 and a portion of the bearing unit 37 which is nonrotatably connected to the piston rod 29 to retain the secondary carriage 38 selectively in the travel position and in the aligned position. That is, the nonrotatable part of the bearing unit 37 carries a laterally projecting plate-like member 41 which is movable between brake elements 42 and 43 carried by the portion of the brake unit 39 secured to the secondary carriage 38. In view of the fact that such plate or disc-like brake units are well known in the art, no further description thereof is deemed necessary.

As shown in FIGS. 5–7, the secondary carriage 38 carries depending support brackets 44 and 46 at opposite ends thereof. Extending between and secured to the support brackets 44 and 46 are guide rods 47 and 48 which extend parallel to each other, as shown in FIG. 8. Mounted for sliding movement along the guide rods 47 and 48 are bearing members 49 which carry a pick-up head 51. In the drawings, I show the pick-up head 51 as having a plurality of transverse members 52 which carry a plurality of suction, pick-up elements 53 which are adapted to pick up a panel-like member 54 from a stack of panel-like members supported on a suitable support frame, indicated generally at 56. Also, the pick-up head 51 is adapted to discharge the panel-like member 54 being transferred at a discharge station. That is to say, the panel-like members 54 are picked up sequentially from the stack of panel-like members supported on the frame 56 whereupon they are then released after being transferred to a desired location, such as a discharge station. Since the construction and operation of such pick-up heads are well known in the art to which my invention relates, no further description thereof is deemed necessary.

To move the secondary carriage 38 to its extended position, a fluid pressure operated unit 57 is secured to the support bracket 44 carried by the secondary carriage 38, as shown in FIG. 8. The unit 57 comprises a cylinder 58 having a piston rod 59 which is connected to the pick-up head 51 by suitable means, such as a clevis connection 60, as shown in FIG. 8. Upon extending the piston rod 59, the pick-up head 51 moves from the solid line position to the dotted line position shown in FIG. 8. That is, the bearing members 49 move along the guide rods 47 and 48 from the position shown in FIG. 5 to the position shown in FIG. 3 whereby the panel-like member 54 is moved toward the right, as viewed in FIGS. 3 and 5. Upon retraction of the piston rod 59, the pick-up head 51 is retracted as it moves toward the left, as viewed in FIGS. 3 and 5. Accordingly, the portion of the secondary carriage 38 connected to the pick-up head 51 is moved linearly relative to the primary carriage 13 selectively to an extended position, as shown in FIG. 3, and to a retracted position, as shown in FIG. 5.

To retain the secondary carriage 38 selectively in an extended position and in a retracted position, a releasable brake unit 61 is carried by the secondary carriage 38 in position for its brake elements 62 and 63 to engage opposite sides of an elongated plate-like member 64 carried by the pick-up frame 51. As shown in FIG. 8, the elongated plate-like member 64 extends parallel to the guide rods 47 and 48. Since the brake unit 61 is of a conventional type, no further description thereof is deemed necessary.

After a panel-like member 54 is picked up by the pick-up head 51 and the piston rod 29 is retracted to its upper position, the motor 26 is energized to drive the endless chain 19 in a counterclockwise direction, as viewed in FIG. 1, whereby the primary carriage 13 is moved toward the right, as viewed in FIG. 1, to a position adjacent the discharge station for the panel-like member. As shown in FIGS. 1 and 3, a limit switch 66 is mounted in position on the supporting frame 10 to be engaged by the primary carriage 13 to stop linear movement thereof prior to its reaching the discharge station. Upon actuation of the limit switch 66 to stop travel of the primary carriage, brake units 39 and 61 are released and the secondary carriage 38 is then moved toward the extended position by actuation of the fluid pressure operated unit 57 whereby the bearing members 49 carried by the pick-up head 51 move from the position shown in FIGS. 1 and 5 to the position shown in FIG. 3. Accordingly, the panel-like member being transferred is moved toward the right, as viewed in FIG. 3.

Alignment stop means which may be in the form of elongated, vertically extending stop members 67 are mounted on the frame 10 in position to engage the leading edge 68 of the panel-like member 54 being transferred in response to movement of the secondary carriage 38 to the extended position. The stop members 67 thus impart rotation to any panel-like member 54 which is misaligned whereby such misaligned panel-like member and its secondary carriage is rotated about a vertical axis from its transport position to an angularly aligned position, as shown in FIG. 4. Any misaligned panel-like member 54 being transferred is thus properly aligned angularly with its edges properly positioned linearly prior to being discharged at the discharge station, as shown in FIGS. 3 and 4.

It will be understood that at the time the fluid pressure operated unit 57 is actuated to move the secondary carriage toward the extended position, the brake units 39 and 61 are released whereby the secondary carriage 38 is adapted for free rotation about its vertical axis as the leading edge 38 of the panel 54 engages the alignment stop members 67. Upon movement of the secondary carriage 38 to the extended position to align the leading edge 68 with the alignment stop members 67, as shown in FIGS. 3 and 4, the brake units 39 and 61 are actuated to restrain rotary and linear movements of the secondary carriage 38 relative to the primary carriage 13. Accordingly, the panel-like member 54 being transferred is held in the proper aligned position until the piston rod 29 is extended to lower the pick-up head 51 to its discharge position at the discharge station. The suction pick-up elements 53 are then deactivated whereby the panel-like member 54 is discharged at the discharge station. At the discharge station, the panel-like member being transferred may be deposited onto a conveyor, onto a stack of such panel-like members, or to any other means for receiving the panel-like members.

After release of the panel-like member at the discharge station, the piston rod 29 is retracted to move the pick-up head 51 to its raised position whereupon the motor 26 is actuated to drive the endless chain 19 in a clockwise direction and thus move the primary carriage 13 and the secondary carriage 38 toward the pick-up station or toward the left, as viewed in FIG. 1. To realign the secondary carriage about its rotational axis, an elongated arm 69 is secured at one end to the secondary carriage 38 with the other end of the arm 39 carrying a properly shaped member, such as a roller 71. The elongated arm 69 extends toward the direction of movement of the carriage 13 as it moves toward the pick-up station, or toward the left, as viewed in FIG. 1. As shown in FIGS. 1 and 9, a generally V-shaped member 72 is carried by a support bracket 73 which is mounted on the supporting frame 10 or on the elongated guide rail 12, as shown. The V-shaped member 72 is provided with leg members 74 which flare outwardly away from each other toward the discharge station, or toward the right, as viewed in FIGS. 1 and 9. Accordingly, as the primary carriage 13 and secondary carriage 38 move toward the pick-up position, the roller 71 moves inwardly of the V-shaped member 72 to thus cause the secondary carriage 38 to pivot about its vertical axis to its travel position. That is, the elongated arm 69 extends in the direction of travel of the carriages along the guide rails 11 and 12 so that any misalignment of the secondary carriage 38 is corrected as the roller 71 engages a leg 74 of the V-shaped member 72 to thus impart rotation to the secondary carriage to its proper travel position. It will be understood that the brake unit 39 is released prior to movement of the arm 69 into the V-shaped member 72 to realign the secondary carriage 38 about its rotational axis. After realignment of the secondary carriage 38 about its vertical axis, the brake 39 is again actuated to retain the secondary carriage 38 in its travel position.

From the foregoing description, the operation of my improved apparatus shown in FIGS. 1-9 will be readily understood. The home position is considered to be the up position of the piston rod 29 and the pick-up head 51 carried by the secondary carriage 38 at the discharge station with the panel-like member 54 in position to be discharged onto a conveyor, a stack or other means for receiving the aligned panel-like member. When a signal is received indicating that another panel-like member 54 is to be discharged, the fluid pressure operated unit 28 is actuated to lower the piston rod 29 and the pick-up head 51 to its discharge position. The pick-up elements 53 are then deactivated to deposit the panel-like member 54 at the discharge station. The unit 28 is then actuated to raise the piston rod 29 and the pick-up head 51 to the upper travel position whereupon the motor 26 is actuated to rotate the drive chain 19 in a clockwise direction to thus move the empty pick-up head 51 toward the pick-up station. The brake unit 61 is released and the cylinder 58 is actuated to retract the piston rod 59 and thus move the secondary carriage 38 and its pick-up head 51 to retracted position. Also, the brake 39 is released prior to movement of the arm 69 inwardly of the V-shaped member 72 whereby the carriage 38 is adapted for free rotation back to its proper travel position as the roller 71 moves inwardly of the V-shaped members 72. After realignment of the secondary carriage about its vertical axis and after movement of the secondary carriage 38 to its retracted position, the brake units 39 and 61 are actuated to retain the secondary carriage in its retracted, travel position.

Upon reaching the pick-up station, the piston rod 29 is lowered to move the pick-up head carried by the secondary carriage downwardly to its pick-up position. The pick-up elements 53 are then activated to attach the panel-like member 54 thereto whereupon the piston rod 29 is then retracted to move the pick-up head upwardly to its travel position. The motor 26 is then actuated to rotate the drive chain 19 in a counterclockwise direction to move the carriages 13 and 38 toward the discharge station whereupon movement of the primary carriage 13 is stopped by the limit switch 66. The brake units 39 and 61 are then released and the fluid pressure operated unit 57 is actuated to move the secondary carriage toward an extended position. As the leading edge of the panel-like member 54 being transferred engages the alignment stop members 67, the panel-like member is rotated with its secondary carriage 38 about its vertical axis to move the panel-like member from its travel position to an aligned angular position with the leading edge 68 of the panel-like member in engagement with the alignment stop members 67, as shown in FIG. 4 to thus position the leading edge properly in a linear direction. After extension of the secondary carriage 38 and alignment of the panel-like member about its vertical axis, the brake units 39 and 61 are again actuated to retain the secondary carriage and the panel-like member 54 carried thereby in the aligned position. The aligned panel-like member then waits at the home position for another signal indicating that another sheet is to be transferred.

Figure 10:
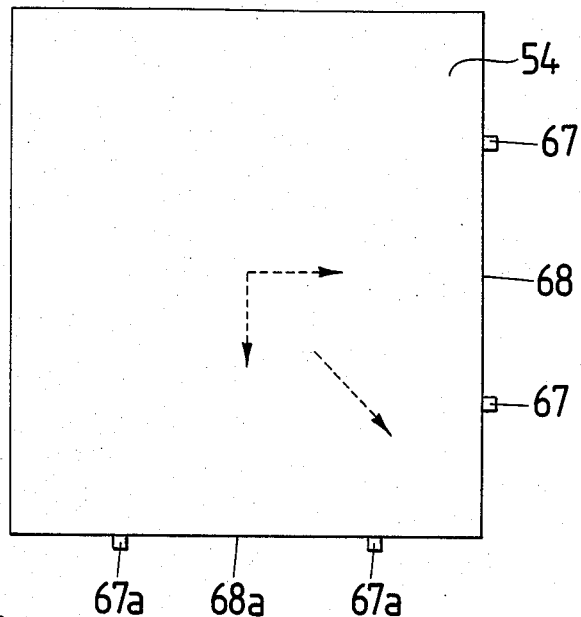
FIG. 10 is a diagrammatic view showing the relative directions of movement of the panel-like member relative to the alignment stop members at the discharge station.
Figure 11:
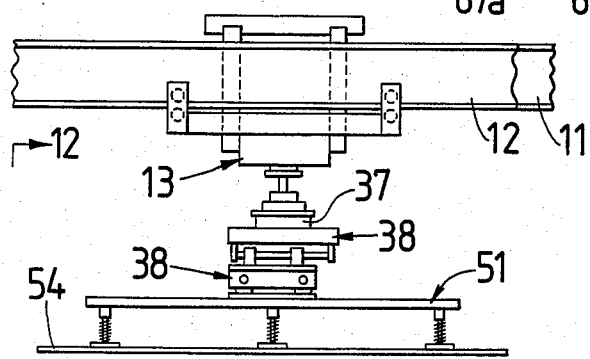
FIG. 11 is a side elevational view, partly broken away and in section, showing a modified form of my invention wherein two extensible secondary carriages are carried by the primary carriage with one secondary carriage being movable in a linear direction at an angle relative to the direction of movement of the other secondary carriage; and, FIG. 12 is a side elevational view taken generally along the line 12—12 of FIG. 11.
Figure 12:
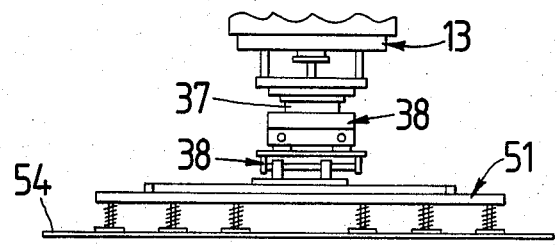

Referring now to FIGS. 10-12, I show a modified form of my invention in which two of the extendible secondary carriages 38 are carried by the primary carriage 13 with one being mounted vertically beneath the other whereby both secondary carriages 38 rotate about the same vertical axis. The uppermost secondary carriage 13 is shown as being movable in a linear direction parallel to the guide rails 11 and 12 with the lower secondary carriage 38 being movable in a linear direction perpendicular to the direction of movement of the upper secondary carriage. Accordingly, the leading edge 68 of a misaligned panel-like member and an edge 68a adjacent thereto engage stop members 67 and 67a to impart rotary movement to each of the secondary carriages to thus move each secondary carriage to its aligned angular position relative to its aligned stop members and at the same time move the leading edge 68 of the panel-like member to its correct position. That is, the uppermost secondary carriage 13 moves the edge 68 of the panel-like member toward the alignment stop members 67 while the lowermost secondary carriage 38 moves the edge 68a of the panel-like member toward the alignment stop members 67a.

From the foregoing, it will be seen that I have devised improved apparatus for transferring and aligning panel-like members. By aligning the panel-like members as they are being transferred from a pick-up station to a discharge station, I eliminate the necessity of having to align the panel-like members in a stack prior to pick up at the pick-up station. Also, by providing extendible secondary carriages which are adapted for rotation about a vertical axis, I greatly facilitate the alignment of the panel-like members as they are moved from the pick-up station to the discharge station. Furthermore, it will be seen that my improved apparatus is extremely simple of construction, economical of manufacture and is efficient in operation to align the panel-like members accurately as they are transferred.

While I have shown my invention in two forms, it will be obvious to those skilled in the art that it is not so limited, but is susceptible of various other changes and modifications without departing from the spirit thereof.

What I claim is:

1. In apparatus for sequentially transferring and aligning panel-like members,
    (a) a pick-up station supporting a stack of panel-like members to be sequentially transferred and aligned,
    (b) a discharge station for receiving said panel-like members after transfer and alignment thereof,
    (c) a primary carriage mounted for linear movement selectively to said pick-up station and to a position adjacent said discharge station,
    (d) at least one extensible secondary carriage carried by said primary carriage and rotatable about a vertical axis selectively to a transport position and to an aligned position and being movable linearly relative to said primary carriage selectively to an extended position and to a retracted position,
    (e) a pick-up head carried by said secondary carriage and adapted for rotation therewith,
    (f) means to move said secondary carriage and the pick-up head carried thereby in a vertical direction selectively to an upper transport position and to a lower pick-up and discharge position,
    (g) means to stop linear movement of said primary carriage prior to its reaching said discharge station, with said secondary carriage being movable toward said extended position after movement of said primary carriage is stopped,
    (h) alignment stop means at said discharge station in position to engage at least one edge of said panel-like member as it is transferred in response to movement of said secondary carriage to said extended position to impart rotation to said panel-like member being transferred and its secondary carriage about said vertical axis from said transport position to said aligned position and to correctly position at least one edge of said panel-like member and thus align any misaligned panel-like member being transferred prior to discharge thereof at said discharge station, and
    (i) means to return said secondary carriage to said retracted position and to said transport position after discharge of said panel-like member being transferred and before returning to said pick-up station.

2. Apparatus for transferring and aligning panel-like members as defined in claim 1 in which said primary carriage is mounted for movement along an elongated guide member which extends linearly between said pick-up station and said discharge station.

3. Apparatus for transferring and aligning panel-like members as defined in claim 1 in which said means to move said secondary carriage in a vertical direction comprises a fluid pressure operated extensible unit carried by said primary carriage and rotatably connected to said secondary carriage to permit rotation of said secondary carriage about said vertical axis.

4. Apparatus for transferring and aligning panel-like members as defined in claim 3 in which said extensible unit is a piston and cylinder assembly.

5. Apparatus for transferring and aligning panel-like members as defined in claim 3 in which said extensible unit is rotatably connected to said secondary carriage by a rotary bearing.

6. Apparatus for transferring and aligning panel-like members as defined in claim 1 in which said secondary carriage is moved selectively to said extended position and to said retracted position by a fluid pressure operated extensible unit and releasable brake means operated retains said secondary carriage selectively in said extended position and said retracted position.

7. Apparatus for transferring and aligning panel-like members as defined in claim 6 in which said fluid pressure operated extensible unit is a piston and cylinder assembly.

8. Apparatus for transferring and aligning panel-like members as defined in claim 1 in which said means to stop linear movement of said primary carriage prior to its reaching said discharge station is a limit switch.

9. Apparatus for transporting and aligning panel-like members as defined in claim 1 in which said alignment stop means comprises at least one stop member in position to engage a leading edge of a misaligned panel-like member being transferred and impart rotary movement thereto from said transport position to said aligned position as said secondary carriage moves toward said extended position.

10. Apparatus for transferring and aligning panel-like members as defined in claim 9 in which releasable brake means retains said secondary carriage selectively in said transport position and said aligned position.

11. Apparatus for transporting and aligning panel-like members as defined in claim 9 in which two of said extensible secondary carriages are carried by said primary carriage with one said secondary carriage being movable in a linear direction at an angle relative to the direction of movement of the other secondary carriage so that said leading edge and an edge adjacent thereto of a misaligned panel-like member engage said stop means to impart rotary movement to each said secondary carriage to its aligned angular position and to correctly position said leading edge and said edge adjacent thereto.

12. Apparatus for transporting and aligning panel-like members as defined in claim 11 in which said one secondary carriage is movable in a linear direction perpendicular to the direction of movement of said other secondary carriage.

13. Apparatus for transferring and aligning panel-like members as defined in claim 1 in which said means to return said secondary carriage to said transport position before returning to said pick-up station comprises,
    (a) an elongated arm carried by said secondary carriage and extending in the direction of travel of said secondary carriage, and
    (b) a generally V-shaped member mounted in the path of movement of said elongated arm as it approaches said pick-up station with the sides of said V-shaped member flaring outwardly toward said discharge station so that movement of said elongated arm within the confines of said V-shaped member moves said secondary carriage to said transport position.

14. Apparatus for transferring and aligning panel-like members as defined in claim 13 in which a roller-like member is carried by said elongated arm in position to move inwardly of said V-shaped member.

* * * * *